United States Patent [19]
Marshall, Sr.

[11] Patent Number: 5,143,608
[45] Date of Patent: Sep. 1, 1992

[54] SYSTEM OF SEPARATION FROM A LIQUID
[75] Inventor: William M. Marshall, Sr., Salem, Va.
[73] Assignee: Morf, Inc., Salem, Va.
[21] Appl. No.: 576,264
[22] Filed: Aug. 31, 1990
[51] Int. Cl.[5] .............................................. B01D 17/38
[52] U.S. Cl. .................................... 210/171; 210/172; 210/187; 210/416.4; 210/512.1
[58] Field of Search ............... 210/171, 183, 187, 172, 210/304, 416.4, 512.1, DIG. 5; 123/514, 557

[56]     References Cited
U.S. PATENT DOCUMENTS

| | | | |
|---|---|---|---|
| 1,731,313 | 10/1929 | Miller | 494/901 |
| 1,921,689 | 8/1933 | Meurk | 210/86 |
| 2,984,410 | 5/1961 | Giacosa | 494/43 |
| 3,014,643 | 12/1961 | Giacosa | 494/43 |
| 3,776,385 | 12/1973 | Maciula et al. | 210/304 |
| 3,784,009 | 1/1974 | Maciula | 210/304 |
| 4,010,101 | 3/1977 | Davey | 210/86 |
| 4,264,442 | 4/1981 | Jackson | 210/86 |
| 4,288,030 | 9/1981 | Beazley et al. | 494/901 |
| 4,321,136 | 3/1982 | Matsui | 210/86 |
| 4,344,561 | 8/1982 | Ilzuki | 494/901 |
| 4,346,009 | 8/1982 | Alexander et al. | 494/901 |
| 4,637,351 | 6/1987 | Pakula | 210/96.1 |

FOREIGN PATENT DOCUMENTS

| | | | |
|---|---|---|---|
| 1108186 | 9/1958 | Fed. Rep. of Germany | 210/304 |
| 1950467 | 11/1968 | Fed. Rep. of Germany | 210/512.1 |
| 988508 | 5/1981 | France | 210/512.1 |

Primary Examiner—Robert A. Dawson
Attorney, Agent, or Firm—John F. C. Glenn

[57]     ABSTRACT

Generating centrifugal action by forcing a stream of petroleum fuel admixed with water along a fixed spiral path, separating the inner and outer portions of the stream, settling out the water in the outer portion, and recombining the two portions less the settled out water. This is particularly useful in a fuel line from which most of the fuel is continually recirculated to the fuel tank.

9 Claims, 6 Drawing Sheets

SYSTEM OF SEPARATION FROM A LIQUID

FIELD OF THE INVENTION

The general field is removing from a liquid an admixed contaminant (liquid or solid) which is immissible in the liquid and has a different specific gravity. The invention is especially useful for removing water from fuel in a continuously recirculating fuel line of a motor vehicle.

BACKGROUND OF THE INVENTION

A widespread problem is the presence of water in petroleum fuels for internal combustion engines. Although undesirable water is often present in engine fuel tanks, especially as a result of condensation. The presence of water is recognized as particularly harmful in the fuel injectors of diesel engines, which are normally protected by separators in the fuel feed line for removal of water before it reaches the engine. Such water separators are conveniently provided with foraminous filter walls, which pass the fuel but hold back the water for periodic discharge (as disclosed, for example, in U.S. Pat. No. 4,637,351). Rotatable devices for centrifugal separation of water from fuel are disclosed, for example, in U.S. Pat. Nos. 1,731,313; 2,984,410; 3,014,643; 4,106,689; 4,288,030; 4,346,009; and 4,344,561. However, foraminous filters have to be replaced from time to time, and rotating devices are relatively complex and expensive.

SUMMARY OF THE INVENTION

The present invention provides a water separator which does not require replaceable elements or elements which have to be rotated during operation. Instead, the separator of the invention directs an incoming stream of fuel or other liquid carbon compounds along a spiral path to generate sufficient centrifugal force to concentrate the water content in an outer portion of the fuel stream passing along an outer portion of the spiral. The said outer stream portion is split off from the inner remaining portion of the stream, and is passed downwardly into a chamber large enough to slow down the inflow and allow the water content to settle to the bottom of the chamber, where it can be drawn off from time to time. The fuel or the like in the chamber, less the water which has settled out, is recombined with the remainder of the fuel stream, and the recombination is conducted out of the separator and through the fuel line to the inlet side of a pump, such as a fuel pump of the kind conventionally used on large trucks. In most cases a large truck's fuel pump recirculates much more fuel back to the fuel tank than it supplies to the truck's engine, and without extra expense it can supply all the pump action needed to generate the centrifugal force required for purposes of the present invention. In other cases, such as occasional removal of water from kerosene in a storage tank, a pump must be obtained to power the centrifugal action of the separator of the invention.

As used herein the term spiral is generic to a spiral advancing radially and to a helix advancing axially.

The water settling action of the separator is preferably aided by directing the fuel or the like from which water has settled, in an upward direction past a series of downwardly cupped baffles and flow retarding means (such as restrictive openings) before recombining it with the rest of the fuel or the like and discharging the recombined streams from the separator.

When the separator is used in a motor fuel line, it is desirable to pass hot motor coolant through the center of the separator, to keep the fuel free flowing in cold weather, and to reduce the possibility of water freezing in the settlement chamber.

Further objects, advantages and details of the invention will become apparent as the following disclosure proceeds.

BRIEF DESCRIPTION OF THE DRAWINGS

Referring now to the accompanying drawings in which there is shown, for purposes of illustration only, present preferred embodiments of the invention.

DETAILED DESCRIPTION OF THE PRESENT PREFERRED EMBODIMENT

Figure 1:
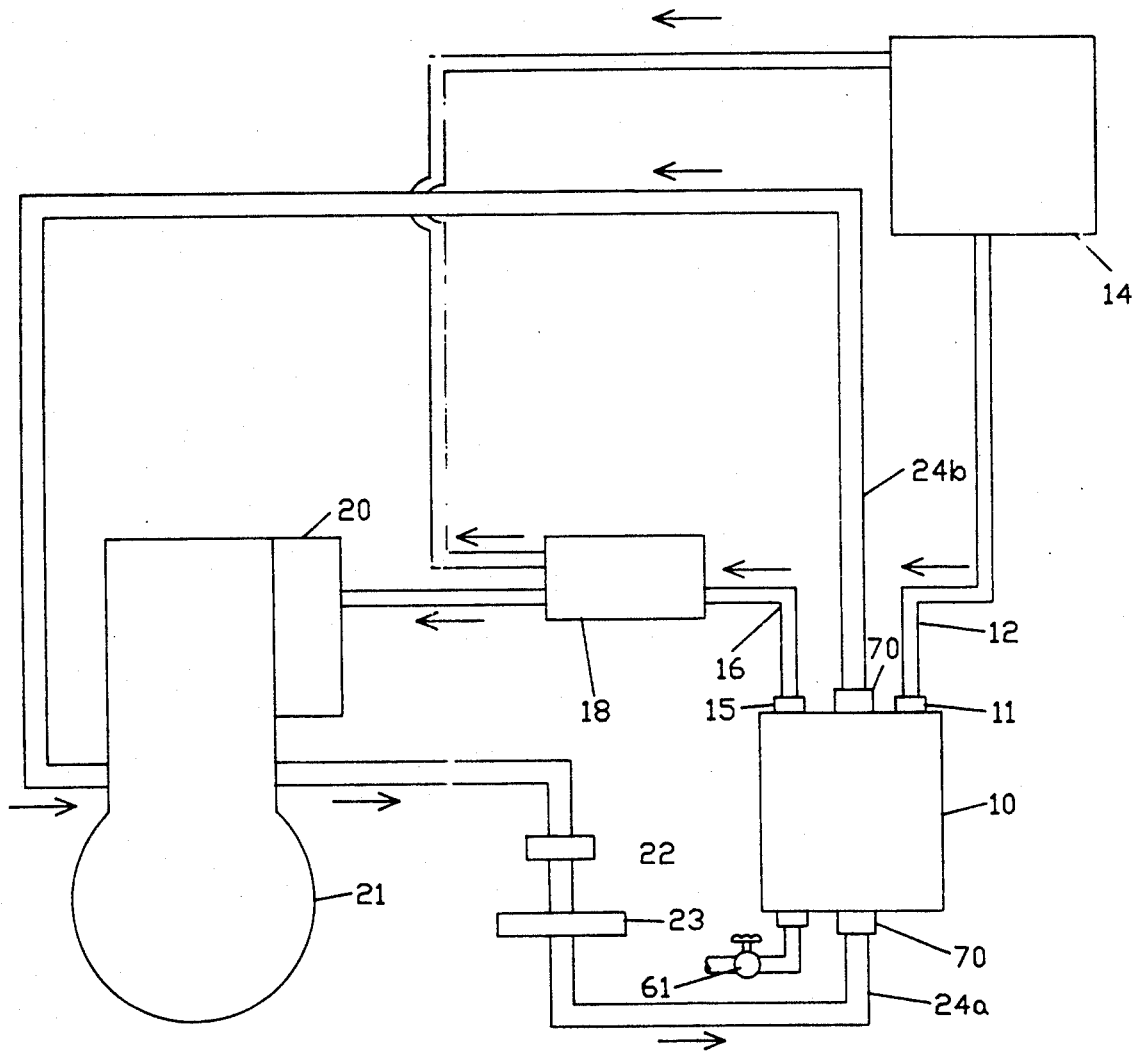
FIG. 1 shows diagrammatically the separator of the invention installed in the fuel line between a fuel tank and an engine.

Referring now more particularly to the drawings and initially to FIG. 1, there is shown a fuel/water separator 10, connected through its inlet connection 11 to a line 12 to a fuel tank 14, and through its outlet connection 15 to a line 16 to the inlet of fuel pump 18. The pump 18 feeds fuel to the fuel injection system 20 of a diesel engine 21. A pump 22 circulates liquid coolant between engine 21 and a radiator 23. At least part of the coolant is passed from radiator 23 through a line 24a into and through separator 10, and from a separator 10 through a line 24b to engine 21. A line 60 is connected to the bottom of a separator 10 to drain off water in the separator when valve 61 in line 60 is opened from time to time while pump 18 is not operating. When the engine is operating, fuel pump 18 induces negative pressure on the separator's outlet fuel line 16 and thereby causes atmospheric pressure to cause fuel to flow from the fuel tank 14 to separator 10 through its inlet line 12 while the fuel outflow from separator 10 discharges through line 16.

Figure 2:
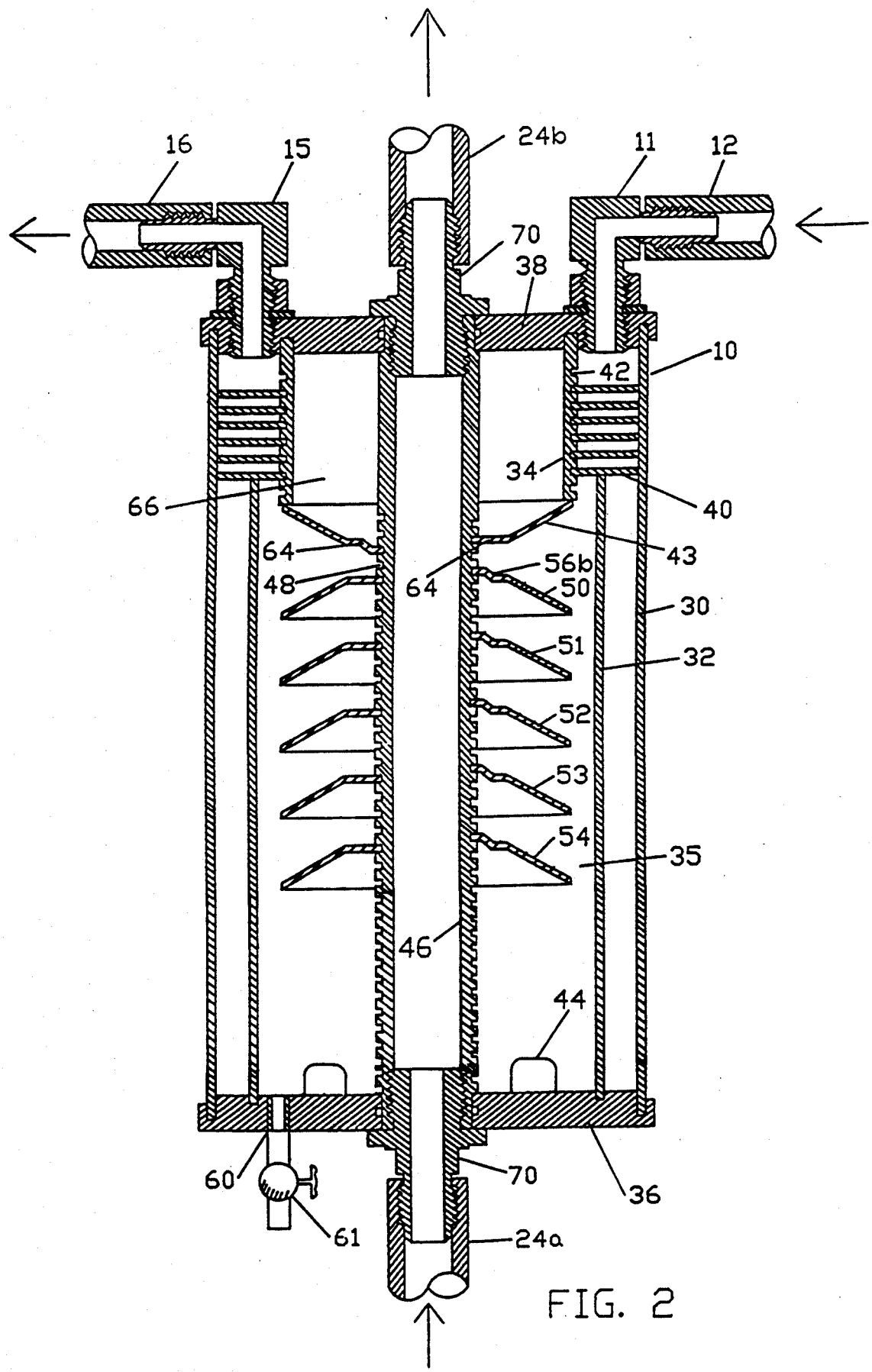
FIG. 2 shows an enlarged section through the center of the separator shown in FIG. 1.

As shown in FIG. 2, separator 10 has an outer cylindrical wall 30, a middle cylindrical wall 32 and an inner cylindrical wall 34, for purposes of containing and guiding flow of fuel through the separator. Walls 30, 32, and 34, are concentric about a common vertical axis, and are radially spaced from each other. The lower ends of walls 30 and 32 are secured to an annular base member 36 which the upper ends of walls 30 and 34 are secured to an annular cap member 38. The radial spacing between walls 30 and 32, and between walls 32 and 34, is about the same. The downward extension of wall 34 from cap 38 is minor compared to the length of wall 30 between cap 38 and base 36. Wall 32 extends upwardly from base 36 far enough to come a little above the lower edge of wall 34, so that the top of wall 32 overlaps the lower end of wall 34. A helical coil 40 of sheet material is mounted between walls 30 and 34 starting closely below cap 38 and beneath the discharge end of intake connector 11 extending through cap 38 to receive fuel from line 12. The inner edge of coil 40 is held in a spiral groove 42 around the outside of inner wall 34. The helical axis of coil 40 is concentric with the common axis of walls 30, 32 and 34 and has a constant pitch as the coil advancing along its axis. The coil ends where it meets and is transversely intersected by the top of middle wall 32. There the stream of fuel passing down the spiral conduit 40', established by coil 40 between walls 30 and 34 is divided by the top of wall 32 into an inner stream and an outer stream. When fuel is pumped in through connector 11 from line 12, it is subjected to centrifugal force as it follows the spiral path established by conduit 40'. When the engine is running, fuel passes through lines 12 and 16 fast enough to develop centrifugal force in the fuel passing through the spiral passageway conduit 40', sufficient to cause at least most water in the incoming fuel to pass to the outer portion of the fuel in conduit 40' before reaching the top of wall 32. There the stream of fuel is divided into an outer portion, which passes down between cylindrical walls 32 and 30, and an inner portion, which passes down between cylindrical walls 32 and 34.

The lower end of wall 32 has openings 44 therethrough to permit the outer stream of fuel (in which water has been concentrated) between walls 30 and 32 to pass into an annular settling chamber 35 formed between wall 32 and a cylindrical tube 46 concentric with walls 30, 32, and 34. The lower end of chamber 35 is closed by a base plate 36 secured to the lower ends of walls 30 and 32 and tube 46 and secured at its opposite ends to cap 38 and base 36. Chamber 35 extends up from base 36 to an annular baffle plate 43 between tube 46 and the lower end of wall 34, and to the part of the lower end of coil 40 between walls 32 and 34. The area between tube 46 and wall 32 is larger than the area between walls 32 and 30 (referring to areas extending normal to the central axes of the tube and walls). This slows the upflow of fuel entering chamber 35 through openings 44 and gives more time for the concentrated water to settle to the bottom of chamber 35.

Figure 4:
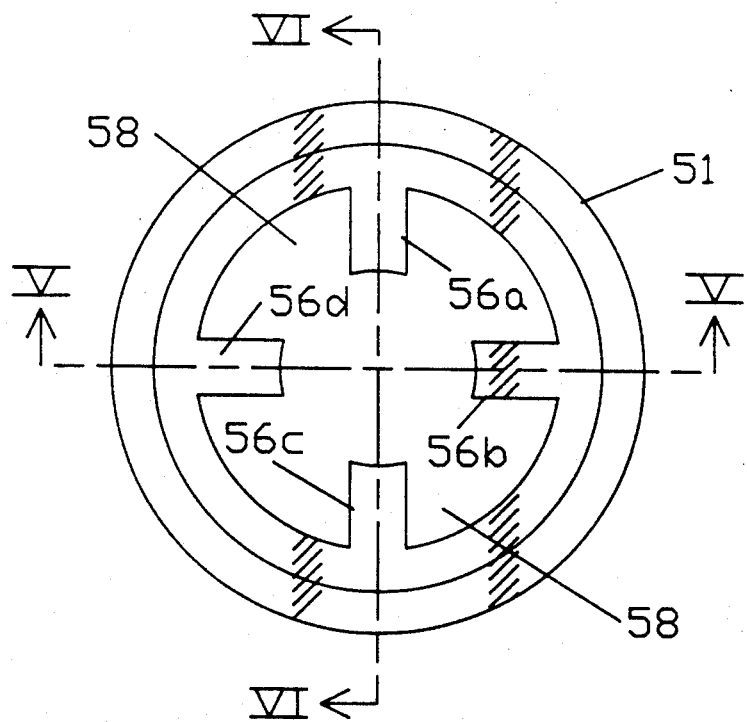
FIG. 4 shows an enlarged top plan view of one of the baffle plates used in the separator shown in FIGS. 2 and 3.
Figure 5:
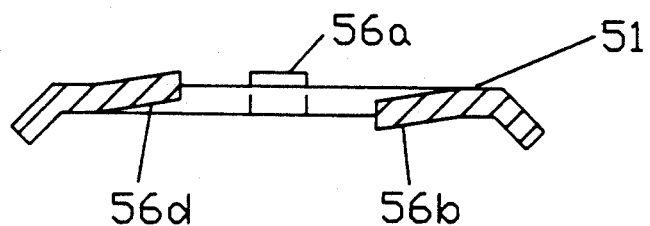
FIG. 5 shows a section on the line V—V in FIG. 4.
Figure 6:
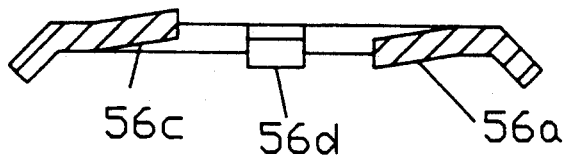
FIG. 6 shows a section on the line V1—V1 in FIG. 4.

A spiral groove 48 extends along most of the length of the outside of tube 46. A series of downwardly cupped annular baffle plates 50, 51, 52, 53 and 54 are mounted in vertically spaced relation along the length of central portion of tube 46. Each of these plates (FIGS. 4-6) has a plurality of circumferentially spaced and radially inward projections 56a-d which extend into groove 48 to support the plate. The spaces 58 between the projections 56 of these plates, plus spacing between the outer peripheral edges of these plates from the inner surface of wall 32, provide passages which permit but retard the rate of upward flow of fuel from the lower end of chamber 35 past baffles 50-54. The downward cupping of these baffles also tends to slow down this upward movement. Consequently, the space of chamber 35 between wall 32 and tube 46 beneath the lowermost baffle 50 constitutes a relatively quiet area where water concentrated in the fuel by the action of coil 40 can settle out to rest on base 36. From there it can be withdrawn periodically through an outlet line 60 through base 36. This can be done through an outlet 60 through base 36, either by manually operating a valve 61 or automatically by the means shown in U.S. Pat. No. 4,838,866 (Marshall), at Col. 3 and FIG. 3.

Baffle plate 43 is identical with the baffles 50-54 but is inverted to be cupped upwardly and is mounted between tube 46 and the bottom of wall 34, with its inward projections inserted into groove 48. The space below baffle 43 and above baffle 50 is where the upward flow past baffle 50 joins the downward flow of the inner split-off part of the stream of fuel passing down from the part of the lower end of coil 40 between walls 32 and 34. The outer periphery of baffle 43 presses against the lower edge of wall 34 to prevent flow between them. The recombined streams pass upwardly through the openings of baffle 43 between its inward projections 64 corresponding to inward projections 56a-b (FIGS. 4-6), and enter an annular space 66 between tube 46 and wall 34. From there the recombined stream is withdrawn from separator 10 through line 16.

The accumulated water in separator 10 is prevented from possible freezing by circulating hot coolant from radiator 23 through tube 46 through lines 24a and -b connected to fittings 70 at opposite ends of tube 46.

Figure 3:
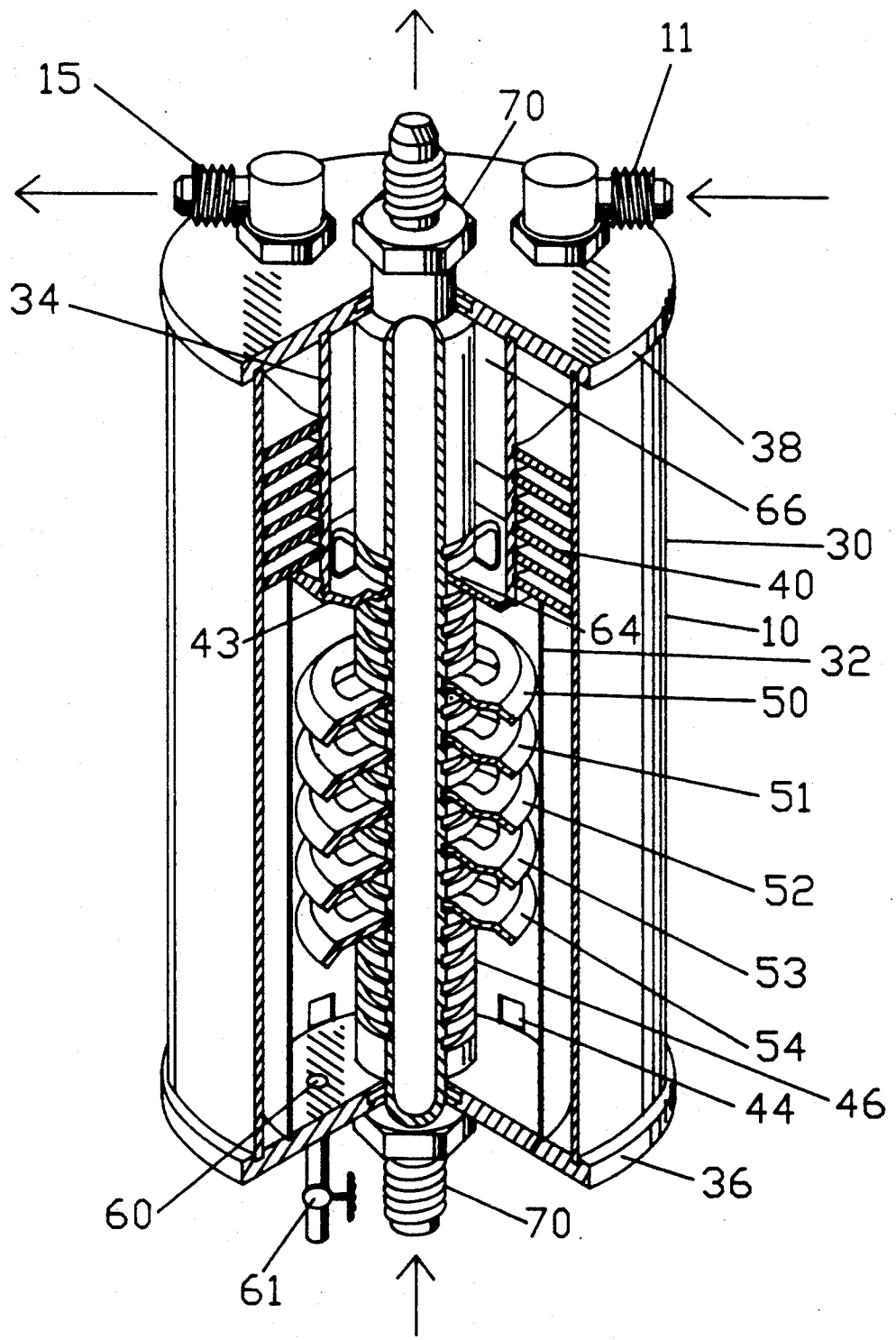
FIG. 3 shows a broken-away isometric view of the separator shown in FIG. 2.

A further improvement, for manufacturing and maintenance purposes, is to use a helical length of preformed metal or plastic tubing 50 (FIG. 7) in place of the helical conduit of rectangular cross section formed by coil 40 as shown in FIGS. 2 and 3. The tubing 50 preferably has an elongated cross-section slanting downwardly from its inner end to its outer end. The inlet end of the tube 50 is attached to a lower inlet fitting 52 (FIG. 8) adapted to be mounted beneath cap 38 and connected through inlet connection 11' (FIG. 7) to inlet line 12. When using tube 50 in the modified separator 10' of FIG. 7 the wall 34 and baffle 43 are omitted. The extreme lower end of tube 50 bends straight down so that two notches 56 cut across it rest on the top edge of wall 32. As a result the stream discharged from tube 50 is split by wall 32 into an outer stream (where any water content is concentrated) which passes down between walls 30 and 32, and an inner stream which passes through the settling chamber 35 and rejoins the outer stream above the uppermost of the baffles 50-54. The rejoined streams leave the separator 10' through outlet connection 15' connected to outlet line 16. The settling action in the lower end of the chamber 35, and the retarded flow of the clarified inner stream to rejoin the outer stream, occur in modified separator 10' of FIG. 7 in generally the same way as in the separator 10 of FIGS. 2 and 3.

Figure 7:
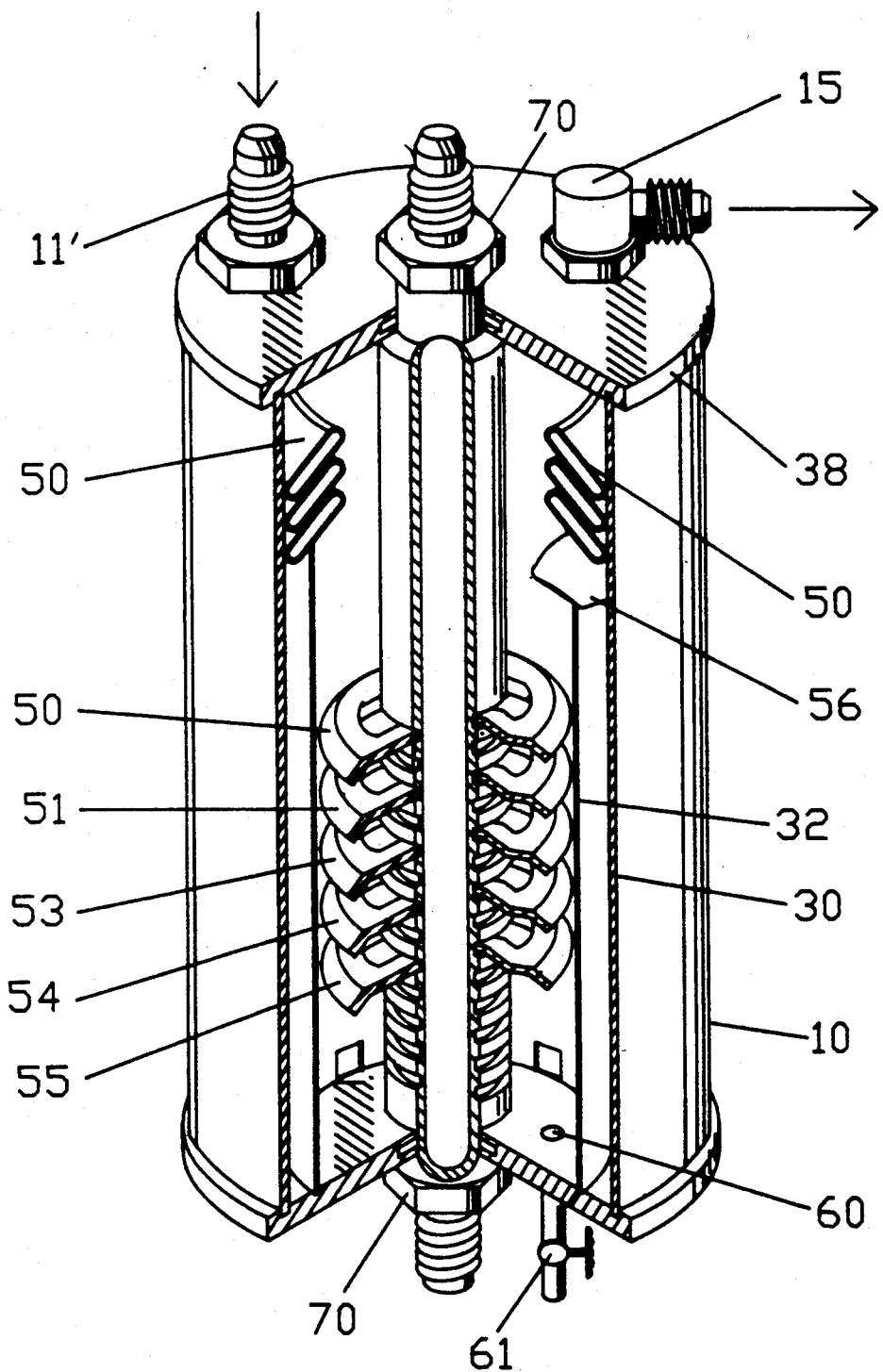
FIG. 7 shows a view corresponding to FIG. 2, but after substitution of a coil of tubing for the spiral conduit shown in FIGS. 2 and 3.
Figure 8:
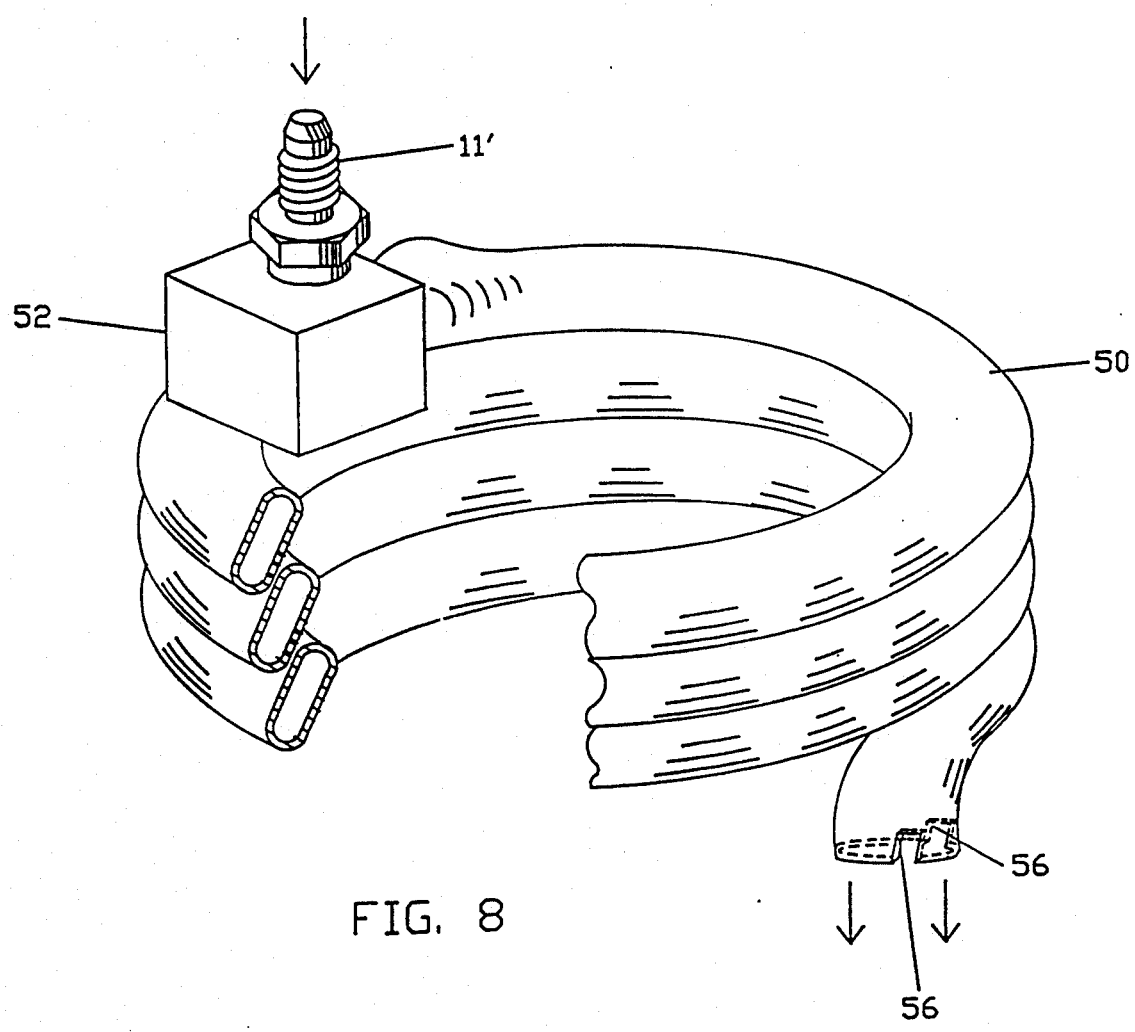
FIG. 8 shows an enlarged perspective view, partially broken away and sectioned, of the coil shown in FIG. 7 and its inlet connection, as a separate assembly before installation in the separator.

A separator like that illustrated in FIGS. 2 and 3, or in FIG. 7, and having an outside diameter of about 5⅝ inches (5.625"), for example, is suitable for removing water from fuel of a diesel truck whose fuel pump delivers through the separator an average of 550 pounds of fuel per hour, of which 124 pounds per hour is consumed by the motor, the balance being recirculated to the fuel tank.

While present preferred embodiments of the invention have been illustrated and described, it will be understood that the invention may be otherwise variously embodied and practiced within the scope of the following claims.

I claim:

1. Apparatus for removing water from liquid fuel moving under pressure, comprising separate inlet means and outlet means for connecting the apparatus to a fuel line; means forming a conduit having a hollow interior which is enclosed except at its inlet and outlet ends, said inlet end being connected to receive liquid fuel from said inlet means, and said conduit having an intermediate portion extending helically about a helical axis and being thereby capable of generating centrifugal force on fuel passing through said intermediate portion, said force being directed radially outwardly from said axis; a settling chamber having one end remote from the conduit outlet end; and inner wall and an outer wall, the outer wall having a portion surrounding the conduit and a portion surrounding the inner wall and spaced therefrom to form a space therebetween; and the inner wall being positioned between the settling chamber and the outer wall and being effective to pass flow of liquid fuel along but not through the inner wall; an inlet into the settling chamber connected to conduct flow from the space between the inner and outer walls into the remote end of the settling chamber; the inner wall comprising flow separating means extending across the outlet end of the conduit to divide the area across the outlet into an outer portion and an inner portion, the outer portion of the divided area being further from said helical axis than the inner portion of the divided area and being positioned to discharge into the space between the inner and outer walls, whereby flow from the conduit is divided into an outer stream and an inner stream, the outer stream being directed into said space between the inner and outer walls and thence into the settling chamber; an outlet from the settling chamber remote from said inlet into the settling chamber; and means to conduct flow from said settling chamber outlet and flow from said inner area of the conduit outlet to said outlet means of the apparatus through a space surrounded by said intermediate portion of the conduit.

2. Apparatus according to claim 1, in which said intermediate portion of the conduit is a tube coiled helically in successive coils substantially side by side.

3. Apparatus according to claim 1, in combination with an internal combustion engine, a fuel tank, a fuel pump having an inlet and outlet, a fuel supply line having one part connecting the fuel tank to said inlet means of said apparatus, having another part connecting said outlet means of said apparatus to the fuel pump inlet, and having an additional part connecting the fuel pump outlet to the engine, and a return line for recirculating to the tank fuel from the pump outlet not required by the engine.

4. Apparatus according to claim 1, comprising a tubular member extending through the settling chamber, and connection means at opposite ends of the tubular member for passing hot motor coolant through the tubular member.

5. Apparatus according to claim 4, comprising flow baffling means mounted around the outside of said tubular member to retard flow out of the settling chamber.

6. Apparatus according to claim 5, in which the flow baffling means is cupped to partially oppose flow out of the settling chamber.

7. Apparatus according to claim 5, in which said tubular member has a helical groove around its outside and the flow baffling means has radially inwardly extending projections which are held in said groove and are spaced apart to allow flow between the projections.

8. In a vehicle having an internal combustion engine, a tank for liquid fuel, a fuel pump, means connecting the fuel pump to receive fuel from the tank and to discharge part of to the engine as required, and a return line for continuous recirculating the part of the fuel not taken by the engine back to the tank, the improvement comprising apparatus in accordance with claim 1, the inlet means of said apparatus being connected to the part of said connecting means which conducts fuel from the tank, and the outlet means of said apparatus being connected to the part of said connecting means which conducts fuel to the engine.

9. Apparatus for removing water from liquid fuel moving under pressure, comprising separate inlet means and outlet means for connecting the apparatus to a fuel line; means forming a conduit having a hollow interior which is enclosed except at its inlet and outlet ends, said inlet end being connected to receive liquid fuel from said inlet means, and said conduit having an intermediate portion extending spirally about a spiral center and being thereby capable of generating centrifugal force on fuel passing through said intermediate portion, said force being directed radially outwardly from said axis; a settling chamber having one end remote from the conduit outlet end; an inner wall and an outer wall, the outer wall having a portion surrounding the conduit and a portion surrounding the inner wall and spaced therefrom to form a space therebetween; and the inner wall being positioned between the settling chamber and the outer wall and being effective to pass flow of liquid fuel along but not through the inner wall; an inlet into the settling chamber connected to conduct flow from the space between the inner and outer walls into the remote end of the settling chamber; the inner wall comprising flow separating means extending across the outlet end of the conduit to divide the area across the outlet into an outer portion and an inner portion, the outer portion of the divided area being closer to the outer wall than the inner portion of the divided area and being positioned to discharge into the space between the inner and outer walls, whereby flow from the conduit is divided into an outer stream and an inner stream, the outer stream being directed into said space between the inner and outer walls and thence into the settling chamber; an outlet from the settling chamber remote from said inlet into the settling chamber; and means to conduct flow from said settling chamber outlet and flow from said inner area of the conduit outlet to said outlet means of the apparatus through a space surrounded by the intermediate portion of the conduit.

* * * * *